United States Patent [19]

Tansky

[11] 3,950,558

[45] Apr. 13, 1976

[54] BEVERAGE BASE AND METHOD OF MAKING THE SAME

[76] Inventor: Michael Tansky, 15 Fourth Place, Long Beach, Calif. 90802

[22] Filed: Sept. 16, 1974

[21] Appl. No.: 506,121

[52] U.S. Cl. ............................. 426/309; 426/596
[51] Int. Cl.² ........................................ A23L 2/02
[58] Field of Search ....... 426/93, 96, 190, 193, 309, 426/460, 466, 596

[56] References Cited
UNITED STATES PATENTS

| | | | |
|---|---|---|---|
| 488,801 | 12/1892 | Trillich | 426/93 |
| 1,069,266 | 8/1913 | Kellogg | 426/309 |
| 1,193,828 | 8/1916 | Sattler | 426/190 |
| 1,631,829 | 6/1927 | Negly et al. | 426/190 |

FOREIGN PATENTS OR APPLICATIONS

| | | | |
|---|---|---|---|
| 751 | 2/1881 | United Kingdom | 426/190 |

*Primary Examiner*—A. Louis Monacell
*Assistant Examiner*—C. A. Fan
*Attorney, Agent, or Firm*—Krass & Young

[57] ABSTRACT

A dry base to be processed in the manner of coffee to produce a coffee-like beverage is produced by coating cereal grain with a liquid extract of carrots and/or parsnips at an elevated temperature. Ground red corn may be added to the coated grain and then the product is roasted.

7 Claims, No Drawings

BEVERAGE BASE AND METHOD OF MAKING THE SAME

FIELD OF THE INVENTION

This invention relates to a dry beverage base which can be used as a coffee substitute and to the method of making such base using cereal grains.

BACKGROUND OF THE INVENTION

A variety of dry beverage bases are available for use in forming coffee-like beverages which have advantages of lower cost than coffee and a freedom from caffeine which restricts the use of coffee by many people.

A number of these coffee substitutes employ cereal grain processed in various ways to improve the flavor of the final product. The present invention belongs to this class and provides a unique manner of processing cereal grains in an economical way to produce a dry base that may be used in the same manner as coffee and has a pleasant coffee-like flavor.

SUMMARY OF THE INVENTION

The present invention broadly consists of a beverage base produced by coating cereal grains with the liquid extract of carrot or parsnip juice, or mixtures thereof, at an elevated temperature and then roasting the coated grains. In a preferred embodiment of the invention, red corn is added to the coated grains before roasting, and granulated chicory is added to the mixture after roasting to enhance the taste of the blend.

Specifically, in the preferred embodiment, carrot juice is initially extracted from chopped sweet carrots by means of a compressor which separates the liquid from the dry substance. A barley and rye grain mixture is cleaned by sifting the grain to segregate the impurities, and then coated with the carrot juice in a mixer at an elevated temperature so that the grain will better absorb the juice. The steeped grain is then mixed with red corn, granulated to the size of the grain, while the elevated temperature is maintained. This coats the grain and gives it a reddish-brown color. The entire mixture is roasted until all the moisture is gone and the grains become dark brown in color. The roasting eliminates the smell of the grains and gives the blend a coffee-like aroma. The mixture is ground to the size of coffee-grounds and granulated chicory is added to enhance the flavor.

The result is a coffee-like beverage base which is prepared in the same manner as coffee, tastes similar to coffee, and yet does not contain any of the caffeine or other potentially harmful ingredients which restrict many people's intake of coffee.

Other objectives, advantages and applications of the invention will be made apparent by the following detailed description of a preferred embodiment of the invention.

PREFERRED EMBODIMENT

In the preferred embodiment of the invention, the beverage base comprises a part mixture of barley and rye grains in equal amounts. The two grains are "cleaned" by a sifting process which segregates the large granules and foreign particles from the finer grain. Only the fine grain is used in the preferred form of the invention. The grain is preheated to a temperature of 275°–350°F and mixed with a carrot extract for approximately one-half hour. The carrot extract coats the grain and gives it a reddish-brown color. The heat is maintained during the mixing process so that the grain will absorb the carrot juice faster thereby giving it a better coating. Approximately one ounce of extract is required for every 2 pounds of grain.

The carrot juice is extracted from selected sweet carrots by first washing and chopping the carrots into small chunks, grating the chunks into fine pieces, and compressing the pieces in a compressor to squeeze the carrot juice from the dry substance. Carrot extract is preferred because of its sweetness and its red color, and the dark brown coating it gives the grain after the mixture is roasted.

Parsnip, a vegetable root of the carrot family, has been found to be a suitable substitute, however, its taste is not as sweet as carrot, and its color is less red.

After steeping the grain, one pound of red or Indian corn, granulated to the size of the barley, is added to every four pounds of grain. The mixture is blended while the 350°F temperature is maintained, for about 10–15 minutes or until all of the grain is well coated and reddish-brown in color.

It has been found that soy beans may be substituted for the red corn without substantially altering the taste and aroma of the beverage. However, soy beans are more expensive than red corn and therefore are a less desirable ingredient.

After the coating process, the entire mixture is placed in a roaster-mixer at a temperature of 300°–325°F and mixed for approximately 35–45 minutes until all of the grain becomes dark brown in color. The roasting process removes any remaining moisture in the blend and eliminates the smell of the grains, giving the entire mixture a pleasant coffee aroma. After roasting, the grain is ground to regular coffee-ground size. At this point, granulated chicory is added to the blend to more closely simulate the taste of coffee. However, the addition of chicory is not to be considered a necessary ingredient of the present invention.

The result is a blend which is prepared in the same manner as coffee, has the look, smell and taste of coffee, yet is cheaper than coffee and contains none of the potentially harmful or habit forming ingredients found in regular coffee.

The embodiments of the invention in which an exclusive property or privilege is claimed are defined as follows:

1. The method of preparing a base useful for producing a beverage when mixed with water consisting of coating a cereal grain chosen from the group consisting of rye and barley with juice of a vegetable chosen from the group consisting of carrots and parsnips, and roasting the coated grain.

2. The method of claim 1 including the further step of preheating the cereal grain prior to coating with the liquid vegetable extract.

3. The method of claim 1 including the further step of adding red corn to the coated cereal grain prior to roasting.

4. The method of claim 1 including the further step of adding chicory to the base after the roasting process.

5. A base for producing beverage when mixed with water, consisting of roasted products of cereal grains chosen from the group consisting of rye and barley, coated with juice of vegetables chosen from the group consisting of parsnips and carrots produced by the method of claim 1.

6. The beverage base of claim 5 wherein said roasted products of cereal grain further includes red corn or soy beans.

7. The beverage base of claim 5 including the addition of chicory to the base.

* * * * *